United States Patent
Ekanayake et al.

(10) Patent No.: US 8,300,635 B2
(45) Date of Patent: Oct. 30, 2012

(54) PROGRAMMABLE CROSSBAR STRUCTURES IN ASYNCHRONOUS SYSTEMS

(75) Inventors: Virantha Ekanayake, San Jose, CA (US); Clinton W. Kelly, San Jose, CA (US); Rajit Manohar, Ithaca, NY (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 433 days.

(21) Appl. No.: 12/557,287

(22) Filed: Sep. 10, 2009

(65) Prior Publication Data

US 2011/0058570 A1   Mar. 10, 2011

(51) Int. Cl.
  *H04L 12/433*   (2006.01)
(52) U.S. Cl. ......... 370/384; 370/386; 370/423; 370/426
(58) Field of Classification Search .................. None
  See application file for complete search history.

(56) References Cited

U.S. PATENT DOCUMENTS

| | | | |
|---|---|---|---|
| 5,396,491 A * | 3/1995 | Newman | 370/355 |
| 5,541,916 A * | 7/1996 | Nobuyuki | 370/395.4 |
| 5,724,276 A | 3/1998 | Rose et al. | |
| 5,926,036 A | 7/1999 | Cliff et al. | |
| 5,943,288 A | 8/1999 | Jiang | |
| 6,359,468 B1 | 3/2002 | Park et al. | |
| 6,611,469 B2 | 8/2003 | Williams et al. | |
| 6,934,816 B2 | 8/2005 | Matthews et al. | |
| 6,961,741 B2 | 11/2005 | Swami | |
| 7,157,934 B2 | 1/2007 | Teifel | |
| 7,301,824 B1 | 11/2007 | New | |
| 7,733,123 B1 | 6/2010 | Young et al. | |
| 7,759,974 B1 * | 7/2010 | Young | 326/41 |
| 7,880,499 B2 | 2/2011 | Rajit et al. | |
| 2002/0019904 A1 * | 2/2002 | Katz | 710/316 |
| 2002/0116426 A1 | 8/2002 | Swami | |
| 2005/0077918 A1 | 4/2005 | Teifel et al. | |
| 2008/0175259 A1 * | 7/2008 | Chao et al. | 370/413 |
| 2010/0013517 A1 | 1/2010 | Manohar et al. | |
| 2010/0102848 A1 | 4/2010 | Gershenfeld et al. | |
| 2010/0185837 A1 | 7/2010 | Dalrymple et al. | |

(Continued)

FOREIGN PATENT DOCUMENTS

KR  10-2008-7031271  8/2011

(Continued)

OTHER PUBLICATIONS

"U.S. Appl. No. 12/304,694, 312 Amendment filed Sep. 30, 2010", 7 pgs.

(Continued)

*Primary Examiner* — Hassan Phillips
*Assistant Examiner* — Duc Duong
(74) *Attorney, Agent, or Firm* — Schwegman, Lundberg & Woessner, P.A.

(57) ABSTRACT

Methods, systems, and circuits for forming and operating a crossbar structure in an asynchronous system are described. One or more input ports of a programmable crossbar structure may be connected to send data to one or more output ports. A group of output ports each receiving data from an input port may be connected to send, in response, control signals via a programmable element to the input port. The number of programmable elements used may be determined by the number of input ports being copied to more than one output port. Additional methods, systems, and circuits are disclosed.

23 Claims, 8 Drawing Sheets

U.S. PATENT DOCUMENTS

2010/0303067 A1    12/2010    Manohar et al.
2011/0121857 A1*    5/2011    Nowick et al. .................. 326/54
2011/0169524 A1    7/2011    Manohar

FOREIGN PATENT DOCUMENTS

| WO | WO-2008/008629 | | 1/2008 |
|---|---|---|---|
| WO | WO-2008008629 | A2 | 1/2008 |
| WO | WO-2008008629 | A3 | 1/2008 |
| WO | WO-2008008629 | A4 | 1/2008 |

OTHER PUBLICATIONS

"U.S. Appl. No. 12/304,694, Notice of Allowance mailed Sep. 20, 2010", 10 pgs.

"U.S. Appl. No. 12/304,694, Preliminary Amendment filed Dec. 12, 2008", 3 pgs.

"U.S. Appl. No. 12/304,694, Response filed Aug. 20, 2010 to Restriction Requirement mailed Aug. 9, 2010", 6 pgs.

"U.S. Appl. No. 12/304,694, Restriction Requirement mailed Aug. 9, 2010", 6 pgs.

"European Application Serial No. 07840303.7, Extended European Search Report mailed Aug. 16, 2010", 7 pgs.

"Korean Application Serial No. 10-2008-7031271, Office Action mailed Sep. 3, 2010", 6 Pgs.

"Korean Application Serial No. 10-2008-7031271, Response to Office Action mailed Nov. 3, 2010", 41 Pgs.

"International Application Serial No. PCT/US2007/072300, International Search Report and Written Opinion mailed Sep. 24, 2008", p. 220.

"U.S. Appl. No. 12/475,744 entitled "Asynchronous Pipelined Interconnect Architecture With Fan-out Support", filed on Jun. 1, 2009".

"U.S. Appl. No. 12/475,744, Non Final Office Action mailed May 27, 2011", 13 pgs.

"U.S. Appl. No. 13/007,933, Non Final Office Action mailed Jun. 20, 2011", 5 pgs.

"Korean Application Serial No. 10-2008-7031271, Response filed Mar. 11, 2011 to Office Action mailed Mar. 11, 2011", 2 pgs.

"Korean Application Serial No. 10-2008-7031271, Final Office Action mailed Mar. 11, 2011", with English translation of Office Action Summary, 5 pgs.

"U.S. Appl. No. 12/475,744, Final Office Action mailed Dec. 23, 2011", 16 pgs.

"U.S. Appl. No. 12/475,744, Response filed Aug. 26, 2011 to Non Final Office Action mailed May 27, 2011", 10 pgs.

"U.S. Appl. No. 13/007,933, Notice of Allowance mailed Oct. 19, 2011", 13 pgs.

"U.S. Appl. No. 13/007,933, Response filed Sep. 20, 2011 to Non Final Office Action mailed Jun. 20, 2011", 9 pgs.

* cited by examiner

PROGRAMMABLE CROSSBAR STRUCTURES IN ASYNCHRONOUS SYSTEMS

BACKGROUND

Asynchronous digital systems, unlike their synchronous counterparts, often operate without centralized control or a global clock signal to coordinate operations. In some asynchronous systems, operations occur under distributed control, and concurrent modular hardware components with well-defined communication interfaces may communicate and synchronize functions over channels.

BRIEF DESCRIPTION OF THE DRAWINGS

Some embodiments of the disclosed technology are illustrated by way of example and not limitation in the figures of the accompanying drawings in which.

DETAILED DESCRIPTION

Example methods, systems, and apparatus related to forming and operating a crossbar structure in an asynchronous system will now be described. In the following description, numerous examples having example-specific details are set forth to provide an understanding of example embodiments. It will be evident, however, to one of ordinary skill in the art, after reading this disclosure, that the present examples may be practiced without these example-specific details, and/or with different combinations of the details than are given here. Thus, specific embodiments are given for the purpose of simplified explanation, and not limitation.

In many embodiments, asynchronous programmable interconnect architectures may use crossbar structures ("crossbars") that provide general connectivity between M-input to N-output ports, where M>1 and N>1. These crossbars, in addition to being able to route each of the M-input ports to any of the N-output ports, may also support copying any one input to any number of outputs up to the total number N. Methods of forming a programmable asynchronous M-to-N crossbar structure that can be used to support many combinations of routing input data (e.g., signals) from input ports to output ports will be described.

In addition, the ability to copy the input data to more than one output port will be discussed. The generality of the M-to-N crossbar structure (as compared to a simple 1-to-N fan-out) allows a variety of implementation. Some embodiments described herein may ease implementation by using regular array structures. Other embodiments may comprise implementations that allow substantial reduction in the chip area that is used.

Figure 1:
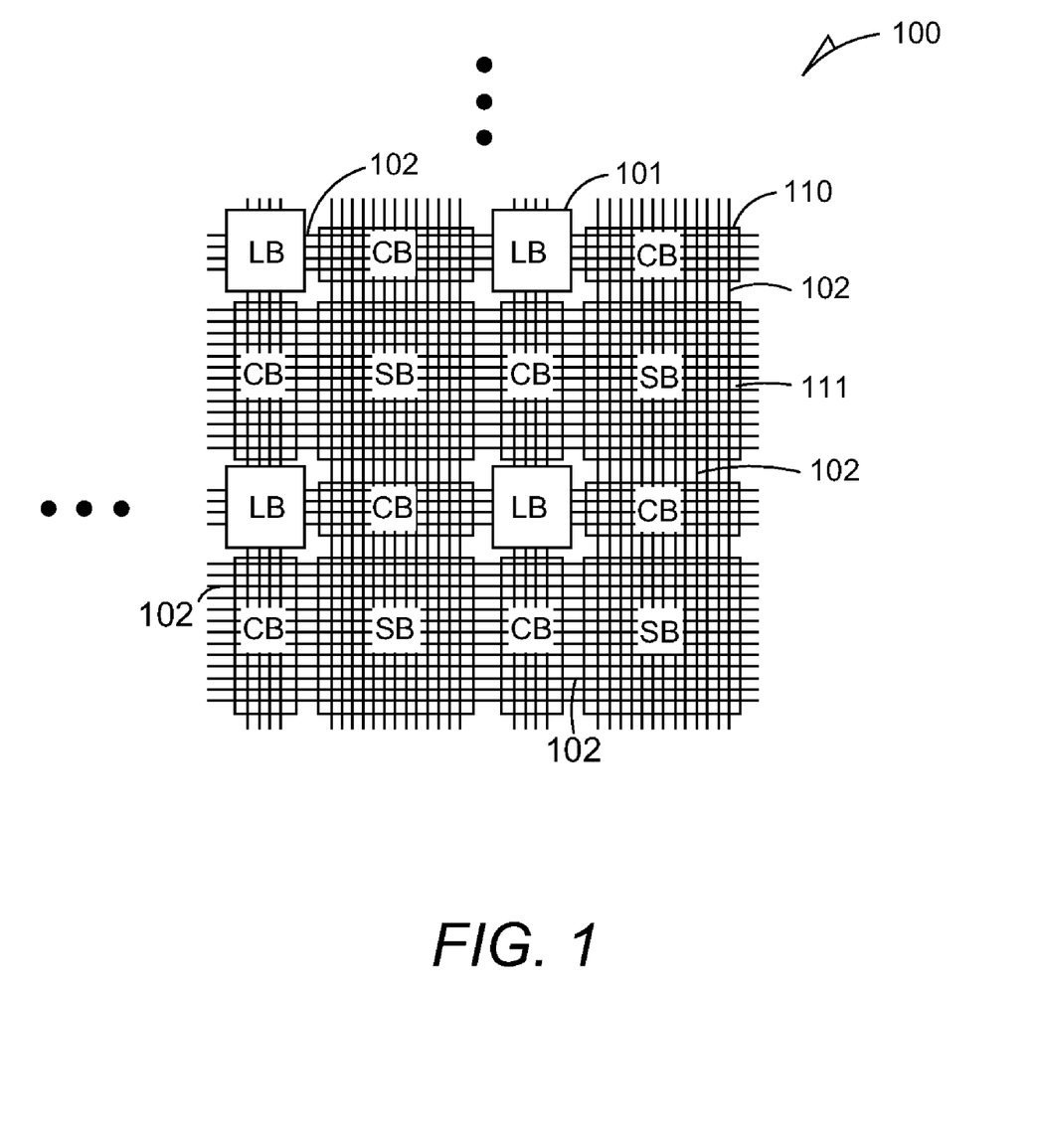
FIG. 1 is a diagram illustrating an island-style architecture of an asynchronous system, according to various embodiments.

FIG. 1 is a diagram illustrating an island-style architecture of an asynchronous system 100, according to various embodiments. The asynchronous system 100 may contain a programmable array of logic blocks (LBs) 101 to support a variety of programmable logic functions. A number of routing tracks 102 (or "tracks" 102) in the architecture may be used to implement a flexible routing and interconnect scheme. Elements of the flexible routing and interconnect scheme (e.g., the programmable crossbar structure discussed below) include connection blocks (CBs) 110 and switch blocks (SBs) 111. The structure of the connection blocks 110 and switch blocks 111 may determine the flexibility of connections supported by the asynchronous system 100.

Unlike synchronous systems that rely on use of a global or a system clock to synchronize operations of various logic gates, the asynchronous system 100 does not necessarily involve the use of a global or system clock. In this way, the use of asynchronous circuits in programmable logic arrays and the like can overcome some of the drawbacks associated with clocked Field Programmable Gate Arrays (FPGAs) and other clocked circuits (e.g., greater power use due to continuous clock signal generation).

Conventional synchronous interconnects may support fan out in a straightforward manner by simply connecting all destinations to each other with switches. However, for the reasons described in patent application Ser. No. 12/475,744, entitled "Asynchronous Pipelined Interconnect Architecture With Fan-out Support," commonly assigned to the assignee of the embodiments described herein and filed on Jun. 1, 2009 (and incorporated herein by reference in its entirety), this solution is not compatible with an asynchronous pipelined interconnect. For example, if a single datum is sent to more than one destination along a pipelined asynchronous interconnect, then multiple replicas of the data may be sent onward along independent interconnect lines, which may result in, for example, increased power consumption, increased die area, and reduced processing speed. Many of the embodiments herein present an M-to-N fan-out by introducing embodiments of a pipelined M-to-N programmable crossbar structure as shown in FIG. 2 discussed below.

Figure 2:
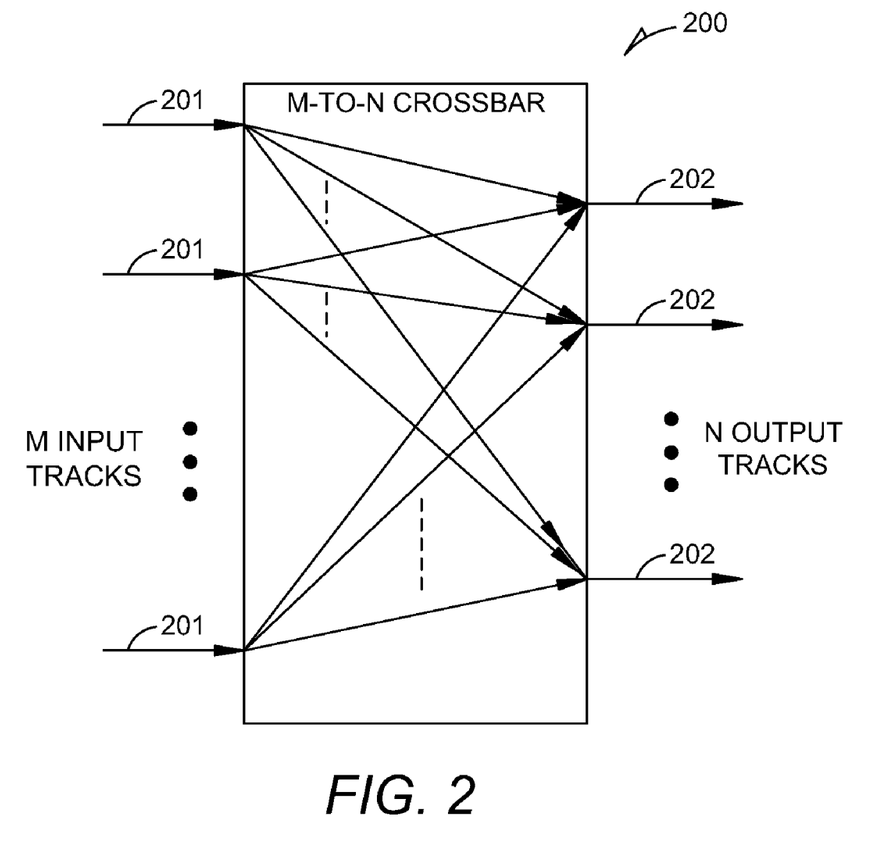
FIG. 2 a diagram illustrating an example programmable crossbar structure for an asynchronous system, according to various embodiments.

FIG. 2 a diagram illustrating an example programmable crossbar structure 200 for the asynchronous system 100, according to various embodiments. As will be shown below, forming a programmable crossbar structure 200 can result in a structure that offers several capabilities that are not available in the crossbar structure used in synchronous systems. For example, a simple general crossbar structure formed by connecting all inputs to all outputs via switches (e.g., pass-gate or transmission-gate based or other forms of switches) may not work for the asynchronous system 100, which can support fan-out by using multiple replicas of data on independent interconnect lines.

Figure 3:
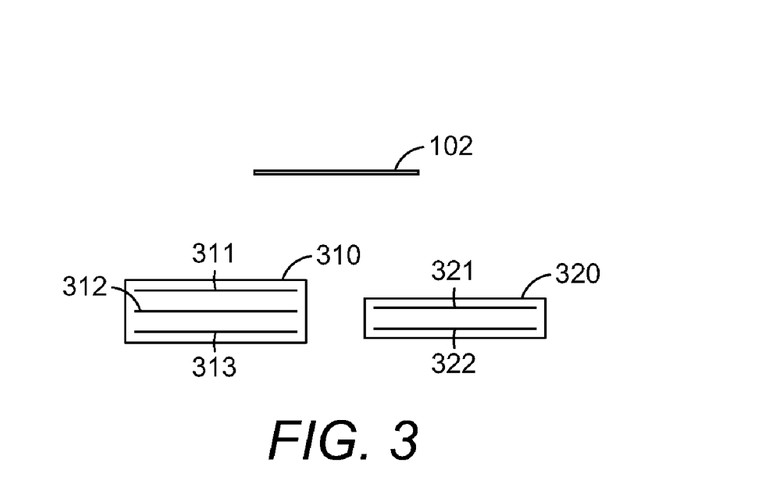
FIG. 3 is a diagram illustrating examples of asynchronous routing tracks, as shown in FIG. 1, according to various embodiments.

In the programmable crossbar structure 200, the input ports (e.g., input port 410 shown in FIG. 4) connected to a number (M) of routing tracks 201 can be connected, in a programmable fashion, to a number (N) of output ports (e.g., output port 430 shown in FIG. 4) coupled to routing tracks 202. The programmable crossbar structure 200 may support many connectivity configurations from input ports to output ports. However, a person of ordinary skill in the art may recognize that for each configuration, a given output port can be connected to send a control signal (e.g., an acknowledge signal) to only one input port. In the programmable crossbar structure 200, each routing track 201 or 202 may be formed by using a bundle of wires that implement an asynchronous communication channel as shown in FIG. 3 described below FIG. 3 is a diagram illustrating examples of asynchronous routing tracks 102, as shown in FIG. 1, according to various embodiments. Different methods to implement an individual routing track 102 of FIG. 1 (including routing tracks 201 and 202 of FIG. 2) when using a programmable pipelined asynchronous interconnect (including the programmable crossbar structure 200) exist. For example, the routing track 102 may be fabricated using a three-wire implementation 310 or a two-wire implementation 320. There are also known methods for implementing the routing track 102 using a single wire and multi-voltage logic.

In the three-wire implementation 310, data wires 311 and 312 may be used to send data, while wire 313 may be used for a control signal (e.g., an acknowledge signal). In the two-wire implementation 320 (sometimes referred to as a "single track"), wires 321 and 322 may be used for both data and acknowledge signals. These wires 321, 322 can be used to implement a wide variety of asynchronous communication protocols, as is well-known to those of ordinary skill in the art.

Other possible implementations of routing track 102 are also possible, where an individual track 102 can be used to route more than one bit of information, such that the programmable routing within a single structure or system may contain heterogeneous protocols, bit-widths, and wire configurations. The example embodiments of the programmable crossbar structure discussed below may use the three-wire implementation 310 and a standard four-phase handshake protocol for communication, with one bit per routing track. However, the technology introduced herein is not limited to a three-wire implementation (e.g., two-wire and one-wire implementations can also be used), and is thus applicable to other implementations of the routing track and handshake protocols.

For example, in the three-wire asynchronous protocol using the three-wire implementation 310 that includes the data wires 311, 312 and the acknowledge wire 313, the data wires 311, 312 may transfer information from a sender to a receiver, whereas the acknowledge wire 313 may transfer information from the receiver to the sender. While one can connect the data wires 311, 312 from a single sender to multiple receivers, one should not connect multiple acknowledge wires (e.g., the acknowledge wire 313) together because each receiver may have an independent acknowledge signal.

Figure 4:
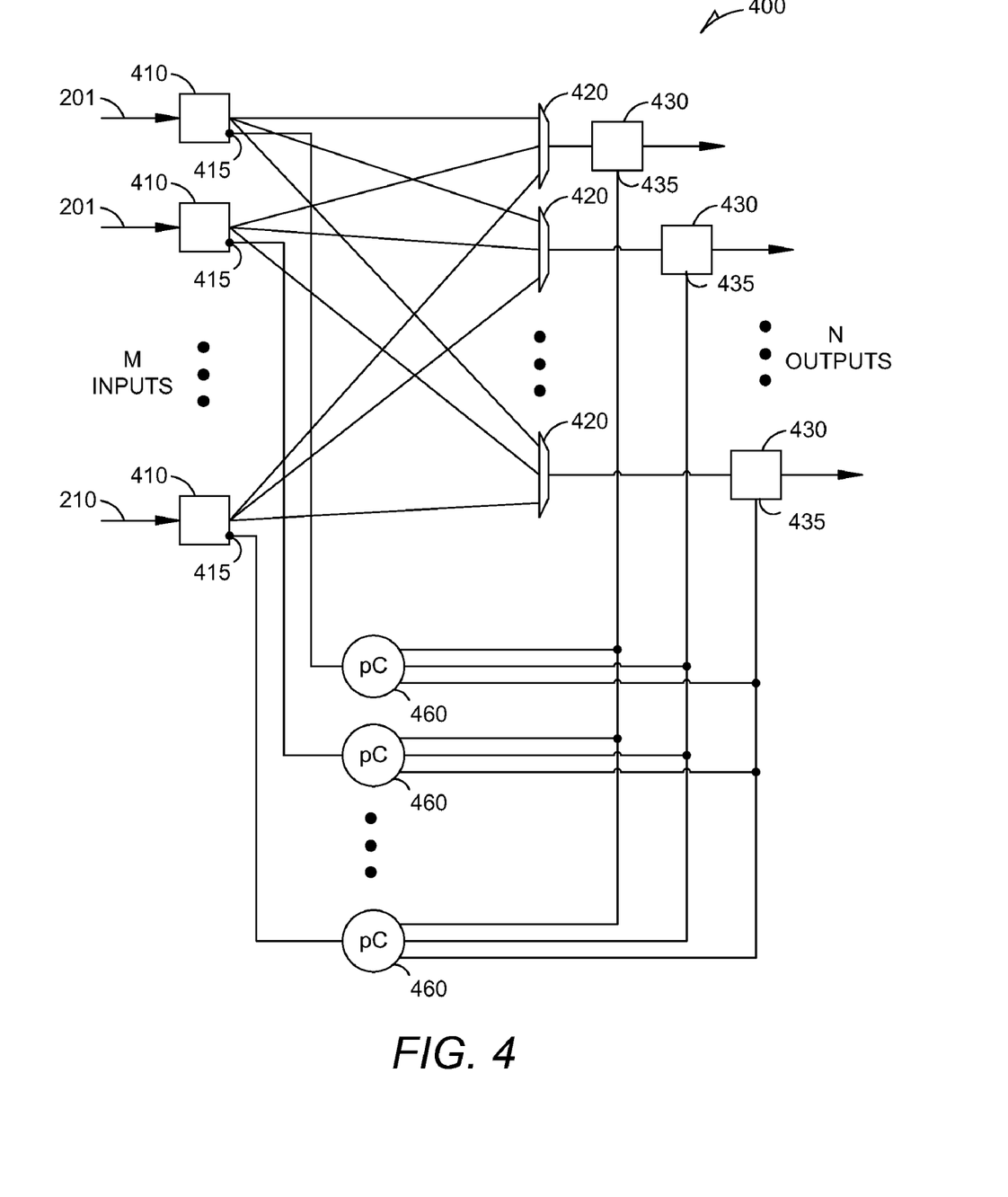
FIG. 4 is a diagram illustrating an example programmable crossbar structure for an asynchronous system, according to various embodiments.

FIG. 4 is a diagram illustrating an example programmable crossbar structure 400 for the asynchronous system 100 of FIG. 1, according to various embodiments. The programmable crossbar structure 400 may include input ports 410 and output ports 430. Each of the input ports 410 or output ports 430 may optionally comprise asynchronous buffers, such as First in First out (FIFO) circuits that facilitate pipelining the operation of the programmable crossbar structure 400. Each of the input ports 410 and output ports 430 may respectively include separate acknowledge input nodes 415 and acknowledge output nodes 435.

The data wires from each input port 410 are connected to the output ports 430 via multiplexer elements 420. The multiplexer elements 420 can be implemented in a variety of ways, either with combinational logic circuits or switches, in a single stage, or using multiple stages of logic circuits. The multiplexer elements 420 may, for example, be programmed to allow a selected input port from the input ports 410 to send data to one or more output ports 430. Data can be copied from a selected input port from input ports 410 to multiple output ports 430 in an asynchronous manner by using a programmable completion detection (pC) element 460.

The pC elements 460 may combine the acknowledge outputs from the output ports that received the copied data into a single acknowledge signal. The combined single acknowledge signal then is sent to the acknowledge input node 415 of the selected input port. The pC elements 460 can be implemented in a variety of ways, as is well-known in the art. Interested readers are encouraged to consult, for example, U.S. Pat. No. 7,157,934, issued to John Teifel and Rajit Manohar, commonly assigned to the assignee of this disclosure, and incorporated herein by reference in its entirety. In some embodiments, the programmable crossbar structure 400 may use M pC elements 460 to provide paths to M input ports.

This implementation can lead to a hardware implementation that comprises M asynchronous buffers at M input ports, M pC elements, and N sets of M switches, with a regular wiring pattern. The implementation provides a flexible way to route any of the M input ports 410 to any one or more output ports 430 including allowing for acknowledge signals to be sent to the input port being copied. A scalable version of the programmable crossbar structure 400 will be described with respect to FIG. 5 below. Programmability of the structure 400 may be provided by a processor embedded in the asynchronous system 100 or a processor external to the asynchronous system 100.

Figure 5:
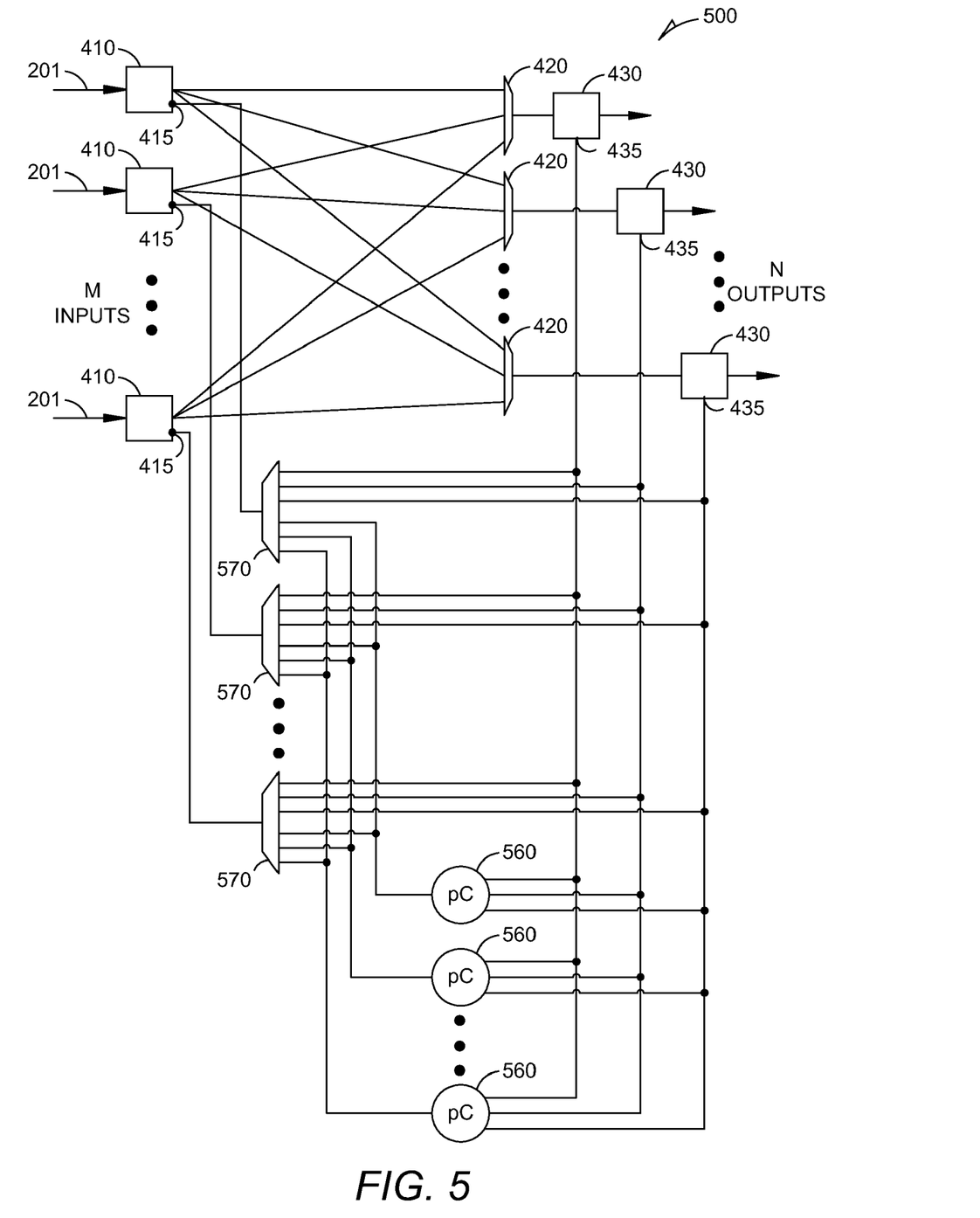
FIG. 5 is a diagram illustrating an example of a modified programmable crossbar structure for an asynchronous system, according to various embodiments.

FIG. 5 is a diagram illustrating an example of a modified programmable crossbar structure 500 for an asynchronous system 100, according to various embodiments. The modified programmable crossbar structure 500 may be less complex and more scalable with respect to the number of pC elements in some embodiments. For example, this modified embodiment may reduce the number of pC elements in use without affecting the generality or flexibility of the programmable crossbar structure 400. The reduction is based on the number of possible copying scenarios. A copying scenario may defined as a scenario in which input data from one input port of the M input ports 410 may be sent via the multiplexer elements 420 to a number of the N output ports 430. The reduced number of pC elements 560 may be determined by following the actions shown in FIG. 6 described below.

As shown in FIG. 5, each pC element 560 may receive, as its inputs, acknowledge signals from output ports 430. Each of a set of M multiplexer elements 570 may programmably provide a connection between outputs of each of the pC elements 560 and the acknowledge input node 415 of one of the input ports 410. Each of the set of M multiplexer elements 570 may also programmably provide a connection between acknowledge output nodes 435 of output ports 430 and the acknowledge input node 415 of one of the input ports 410. Programmability of the structure 500 may be provided by a processor embedded in the asynchronous system 100 or a processor external to the asynchronous system 100.

Figure 6:
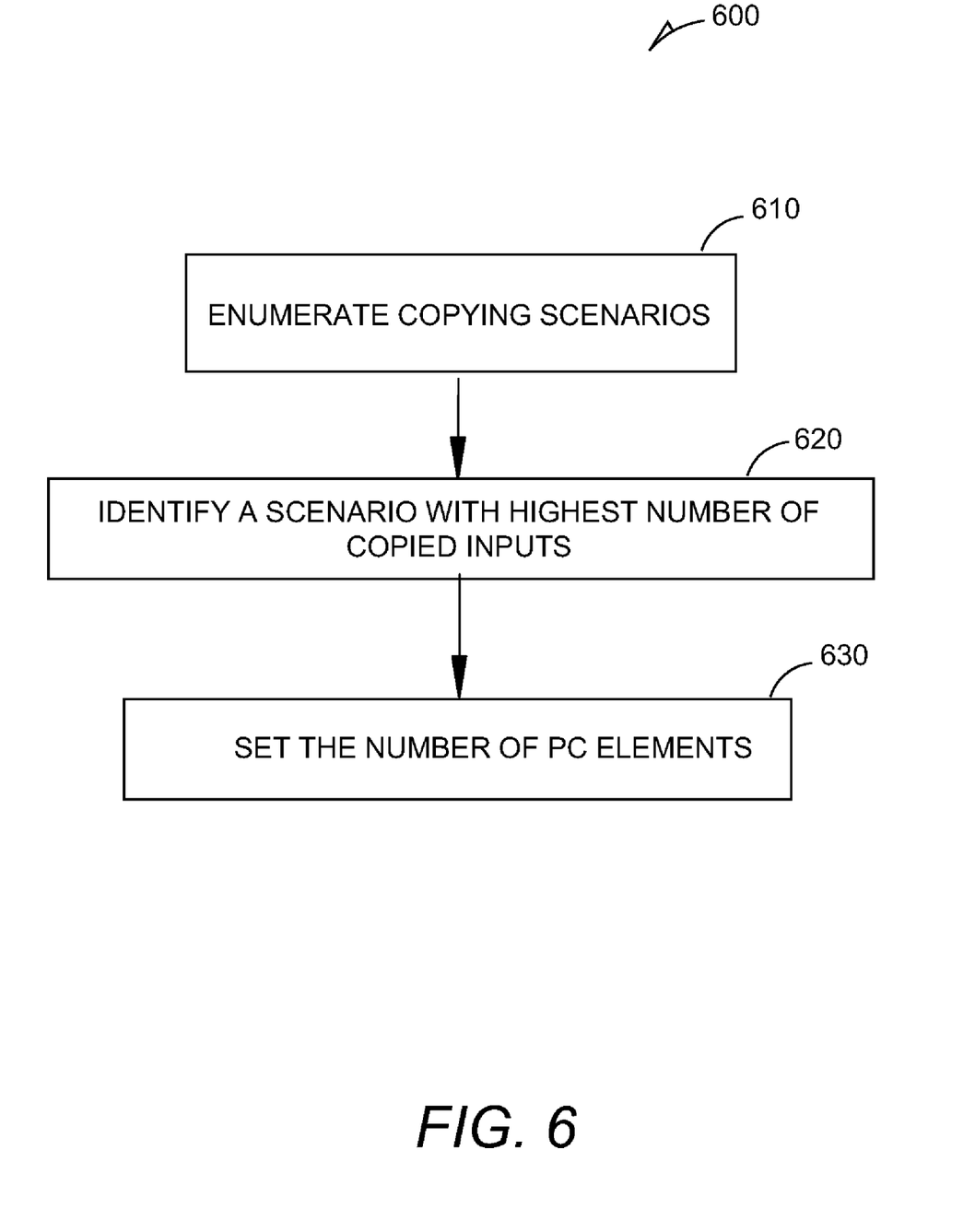
FIG. 6 is a diagram illustrating a method of determining a number of programmable completion detection elements used in the programmable crossbar structure of FIG. 5, according to various embodiments.

FIG. 6 is a diagram illustrating a method 600 of determining a number of programmable completion detection elements used in the programmable crossbar structure 500 of FIG. 5, according to various embodiments. The method 600 may be implemented using a processor embedded in the asynchronous system 100 or a processor external to the asynchronous system 100. At block 610, for the number N of output ports of the programmable crossbar structure 500, a number of possible distinct scenarios is enumerated. For example, consider a case where N=5. In this case three possible distinct scenarios arise: (1) data from one input port is copied to all five output ports; (2) data from one input port is copied to four output ports; (3) data from one input port is copied to three output ports, while data from another input port is copied to two other output ports.

The enumerated set of scenarios may be considered as a complete set for the case of N=5. Other possible scenarios may comprise only subsets of the above set (e.g., data from one input port is copied to three output ports and the two other output ports are unused) or comprise non-copying direct connections (e.g., data from five input ports each are sent to a single output port).

At block 620, the scenario with the highest number of copied input ports from the enumerated set of scenarios is identified. In the example described above, the highest number of copied input ports occurs in scenario (3). In this scenario there are two input ports which are copied to output ports, whereas other scenarios show only one input port copied.

At block 630, the number of pC elements to be used in the programmable crossbar structure 500 may be set to a number corresponding to the highest number of copied input ports. For example, in the set of scenarios discussed above, where N=5, the number of pC elements may be set to 2. As the number of input ports M changes, the copying scenarios and, as a result, the number of copied inputs in those scenarios may not change. In other words, the number of pC elements may depend on the number of output ports N and be independent of the number of input ports M.

The programmable crossbar structure 500 of FIG. 5 is therefore modified as compared to the programmable crossbar structure 400 of FIG. 4 in two respects. First, the output of each the pC elements 560 of FIG. 5 may have a path to the acknowledge input nodes 415 of input ports 410. Second, the acknowledge nodes of each output port 430 may have a path to acknowledge input nodes 415 of input ports 410 through pC elements 560, or directly through the multiplexer elements 520.

Figure 7:
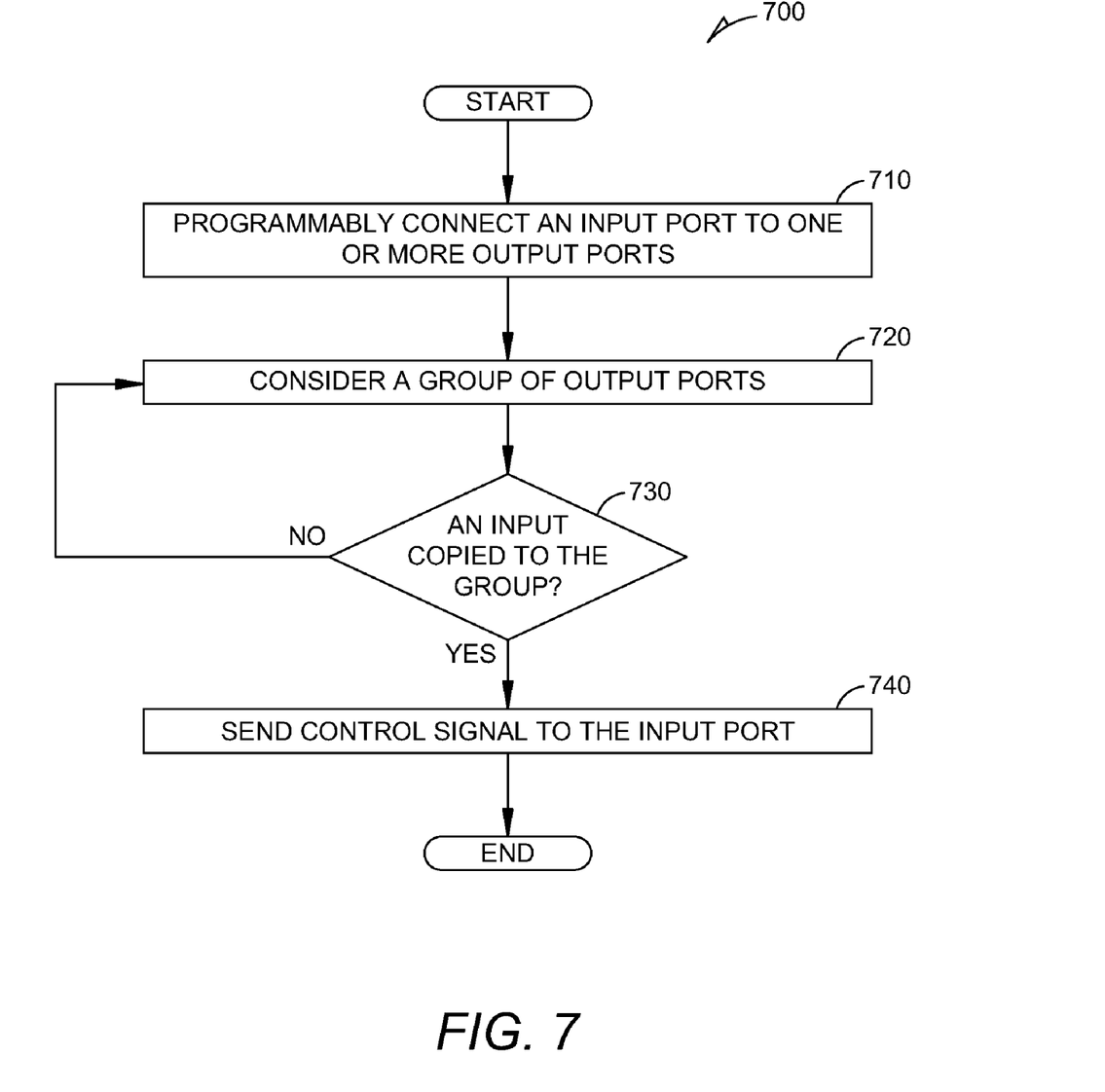
FIG. 7 is a diagram illustrating a method of forming a programmable crossbar structure for an asynchronous system, according to various embodiments.

FIG. 7 is a diagram illustrating a method 700 of forming a programmable crossbar structure for an asynchronous system 100, according to various embodiments. At operation 710, one or more of the M input ports 410 of FIG. 5 may be programmably connected to one or more of the N output ports 430. The multiplexer elements 420 may programmably permit one or more of the M input ports 410 to send data to one or more output ports 430 of FIG. 4. A group of output ports, which may receive data from an input port, can be programmed to send acknowledge signals to that input port.

At operation 720, a group of output ports 430, which may receive data, are considered. If, at control operation 730, it is determined that the group may receive data from an input port, then the control is passed to operation 740. At operation 740, in response to receiving the data from the input port of the input ports 410, the group of output ports 430 may be connected to send acknowledge signals via one of the pC elements 560 to that input port, from which the data was received. The number of pC elements 560 may be determined based on a number of input ports being copied to more than one output ports, as described with respect to FIG. 6. If, at control operation 730, it is determined that the group may not receive data from that input, then the control is passed to operation 720 to consider another group of output ports. Programmability may be provided by a processor embedded in the asynchronous system 100 or a processor external to the asynchronous system 100. The programming capabilities may allow selection of various paths between input ports 410 and output ports 430 to be connected (electrically) as described below.

Figure 8:
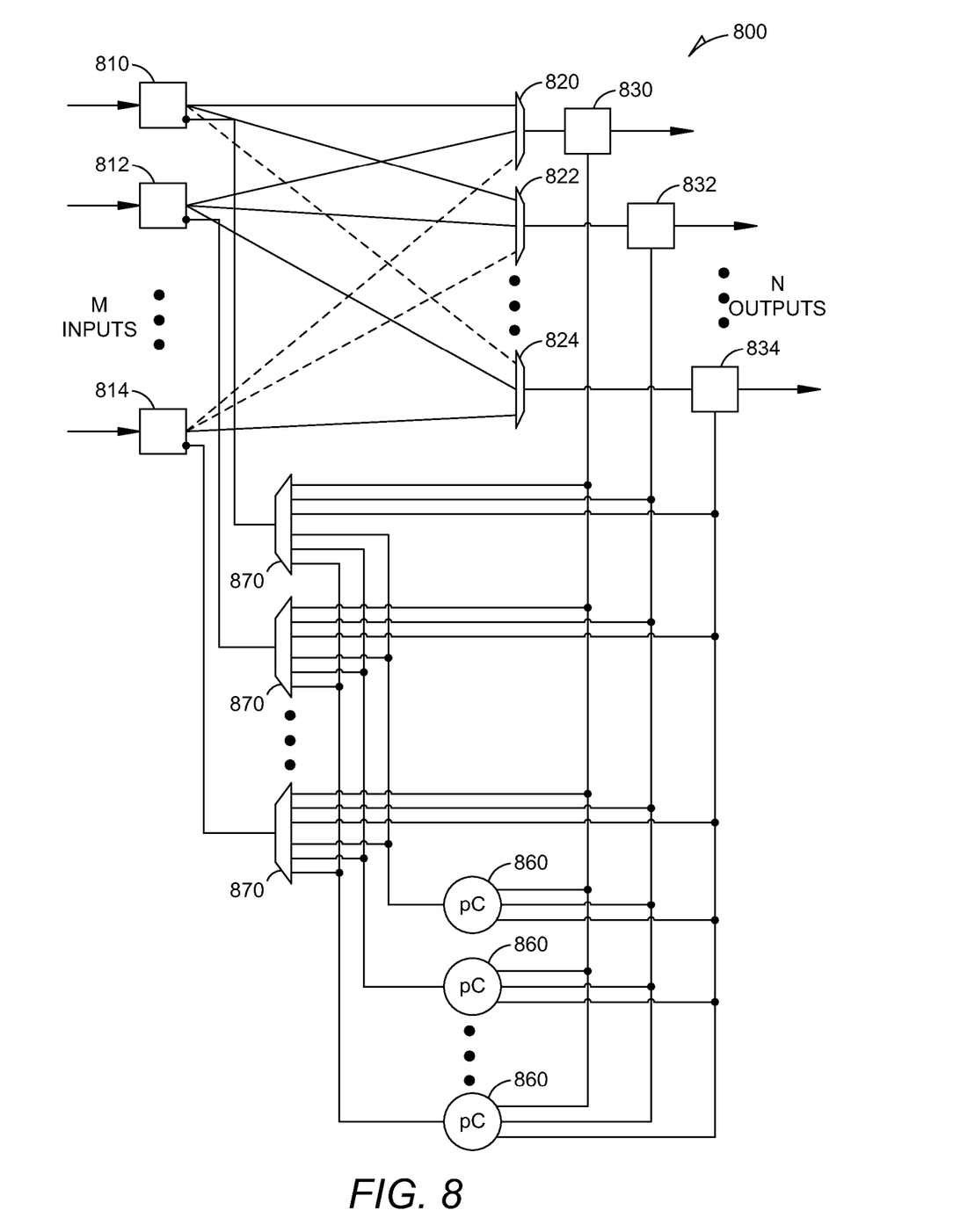
FIG. 8 is a diagram illustrating an operational example of a programmable crossbar structure for an asynchronous system, according to various embodiments.

FIG. 8 is a diagram illustrating an operational example of a programmable crossbar structure 800 for the asynchronous system 100, according to various embodiments. Programmability of the programmable crossbar structure 800 may be provided by a processor embedded in the asynchronous system 100 or a processor external to the asynchronous system 100. The programmable connections between input ports 810, 812, and 814 and output ports 830, 832, and 834 may be implemented using the multiplexer elements 820, 822, 824. As shown in FIG. 8, each of the inputs ports 810-814 may be provided with a path to every one of output ports 830-834. However, the multiplexer elements 820-824 may also be configured to allow only paths denoted by solid lines to actually provide electrical connection.

For example, in the operational state shown in FIG. 8, the multiplexer element 820 may allow only input ports 810 and 812 to send data to output port 830, while the multiplexer element 822 may allow only the input ports 810 and 812 to send data to output port 832. Similarly, the multiplexer element 824 may allow only the input ports 812 and 814 to send data to output port 834.

To reduce the complexity of the analysis, consider a configuration in which the number of output ports N is limited to three, e.g., the output ports are limited to output ports 830-834 as shown in FIG. 8. The distinct copying scenarios in this case are: (1) one input port copying to three output ports and (2) one input port copying to two output ports.

The operational state shown in FIG. 8 represents the scenarios (1) and (2); thus, the highest number of copied inputs is equal to one. Connections from other input ports of the M input ports (shown with dots in FIG. 8) cannot generate a scenario distinct from the ones enumerated above. Therefore, connection of only one pC element of the pC elements 860 may be sufficient for the example configuration assumed above (with any number M of input ports and three output ports). For the assumed configuration, the multiplexer elements 870 may allow only one of the pC elements, e.g., 860 to connect to M input ports (only 810, 812, and 814 are shown in FIG. 8) to provide paths for the acknowledge signals from the three output ports 830-834 to the M input ports. However, as the number of output ports increases, the number of distinct scenarios and the number of copied inputs in the scenarios may also increase.

Figure 9:
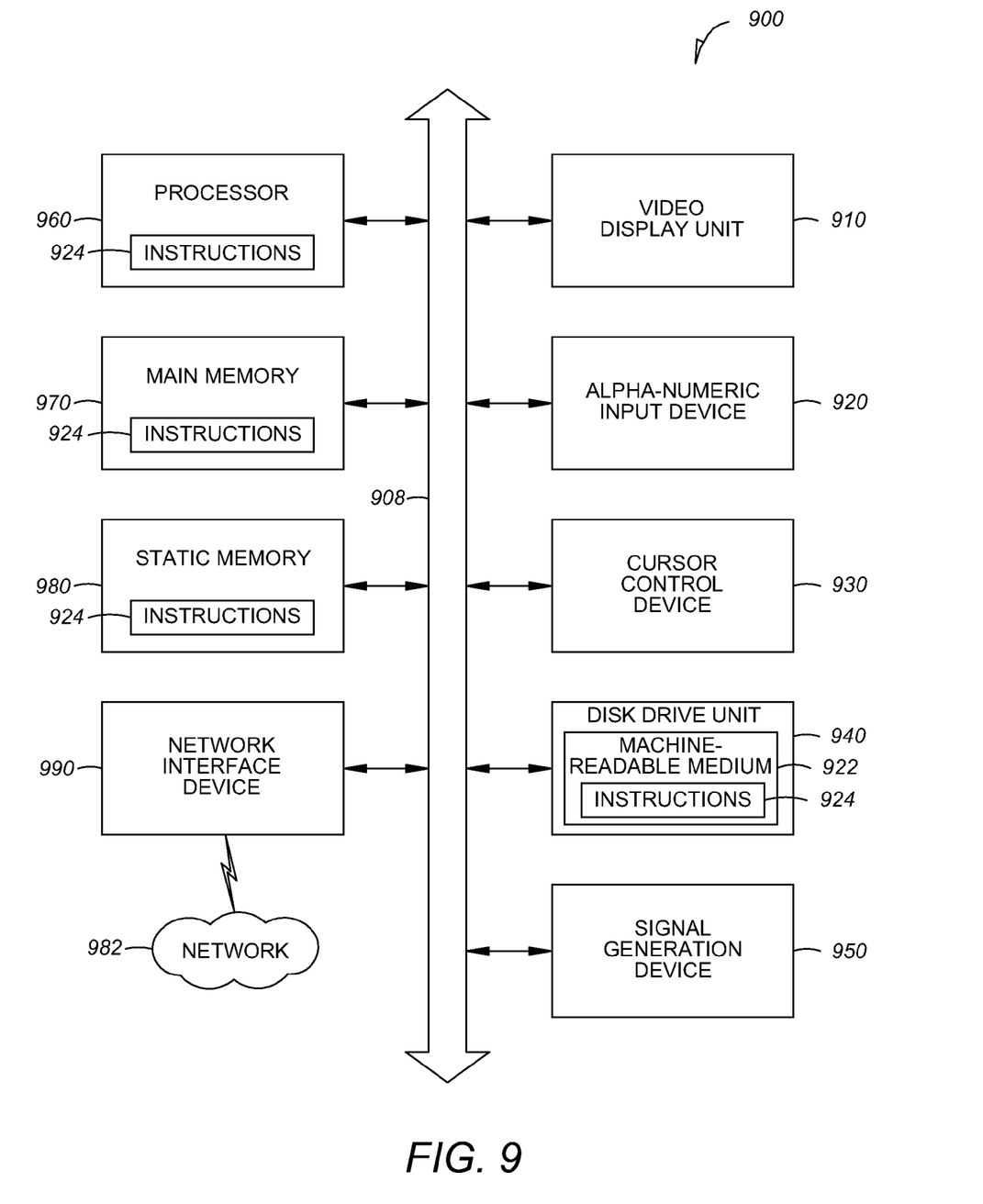
FIG. 9 shows, a diagram illustrating a system, according to various embodiments.

FIG. 9 shows, a diagram illustrating a system 900, according to various embodiments. The system 900 may comprise a set of instructions that can be executed to cause the system 900 to perform any one or more of the methodologies discussed herein. In alternative embodiments, the system 900 may operate as a standalone device or may be connected (e.g., networked) to other systems. In a networked deployment, the system 900 may operate in the capacity of a server or a client system in a server-client network environment or as a peer system in a peer-to-peer (or distributed) network environment. System 900 may be realized as a specific machine in the form of a computer.

The system 900 may be a server computer, a client computer, a personal computer (PC), a tablet PC, or any system capable of executing a set of instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein.

The example system 900 may include the processor 960 (e.g., a central processing unit (CPU), a graphics processing unit (GPU) or both), a main memory 970 and a static memory 980, all of which communicate with each other via a bus 908. The system 900 may further include a video display unit 910 (e.g., a liquid crystal display (LCD) or cathode ray tube (CRT)). The system 900 also may include an alphanumeric input device 920 (e.g., a keyboard), a cursor control device 930 (e.g., a mouse), a disk drive unit 940, a signal generation device 950 (e.g., a speaker), and a network interface device 990.

The disk drive unit 940 may include a machine-readable medium 922 on which may be stored one or more sets of instructions (e.g., software) 924 embodying any one or more of the methodologies or functions described herein. The instructions 924 may also reside, completely or at least partially, within the main memory 970 and/or within the processor 960 during execution thereof by the system 900, with the main memory 970 and the processor 960 also constituting machine-readable media. The instructions 924 may further be transmitted or received over a network 982 via the network interface device 990.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium capable of storing, encoding, or carrying a set of instructions for execution by the machine and that cause the machine to perform any one or more of the methodologies of the present technology. The term "machine-readable medium" shall accordingly be taken to include, but not be limited to tangible media, including solid-state memories and optical and magnetic media.

Various embodiments for forming a programmable crossbar structure for an asynchronous system have been described. The embodiments may support implementing M-to-N routing and fan-out for asynchronous systems, increasing the flexibility of routing in these systems. Some embodiments may result in substantial reduction in the chip area used. Although example embodiments have been described, it will be evident, after reading this disclosure, that various modifications and changes may be made to these embodiments. Accordingly, the specification and drawings are to be regarded in an illustrative rather than a restrictive sense.

The abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A circuit comprising:
   An asynchronous programmable crossbar structure comprising a plurality of input ports and a plurality of output ports, one or more of the plurality of input ports to be programmably connected to send data to at least one output port of the plurality of output ports; and
   a group of output ports, each capable of receiving data from an input port, to be programmably connected to send, responsive thereto, control signals via a programmable element to the input port, and a number of programmable elements used being determined based on a number of input ports being copied to more than one output port.

2. The circuit of claim 1, wherein each port of the plurality of input ports and output ports comprises a plurality of nodes, each node connected to a wire of a routing track.

3. The circuit of claim 2, wherein the routing track is to interconnect logical blocks of an asynchronous circuit.

4. The circuit of claim 1, wherein the programmable element comprises a programmable completion detection element and at least some of the group of output ports is to receive copies of single data from the input port.

5. The circuit of claim 1, wherein the control signals comprise acknowledge signals.

6. The circuit of claim 1, further comprising a plurality of multiplexer elements to programmably connect at least some of the plurality of input ports to at least some of the plurality of output ports.

7. The circuit of claim 6, wherein at least some of the plurality of multiplexer elements can be programmed to connect at least some of a selected group of input ports to a selected group of output ports.

8. The circuit of claim 1, wherein the number of programmable elements is included in a plurality of programmable elements, wherein at least some of the plurality of programmable elements can be programmed to receive signals from at least some of acknowledge outputs of the group of output ports and to send an acknowledge signal to an acknowledge input of the input port.

9. The circuit of claim 8, further comprising a plurality of multiplexer elements, wherein at least some of the plurality of multiplexer elements can be programmed to send acknowledge signals from at least some of the plurality of programmable elements to the acknowledge input of at least one of the plurality of input ports.

10. The circuit of claim 9, wherein at least some of the multiplexer elements can be programmed to connect the acknowledge outputs from at least some of the plurality of output ports to the acknowledge input of at least one of the plurality of input ports.

11. The circuit of claim 9, wherein the acknowledge signals from the at least some of the plurality of programmable elements can be programmably provided a path to at least some of the plurality of input ports.

12. A method comprising:
   programmably connecting one or more of a plurality of input ports to at least one output port of a plurality of output ports to send data to the at least one output port at an asynchronous crossbar; and
   programmably connecting a group of the plurality of output ports, each receiving data from an input port, to send control signals via a programmable element to the input port in response to receiving the data, and a number of programmable elements used to be determined based on a number of input ports being copied to more than one output port.

13. The method of claim 12, further comprising programmably connecting at least some of the plurality of input ports to at least some of the plurality of output ports using multiplexer elements.

14. The method of claim 12, further comprising connecting at least some of acknowledge outputs from at least some of the group of output ports, via a programmable element in the number of programmable elements, to send an acknowledge signal to an acknowledge input of the input port.

15. The method of claim 12, further comprising programmably connecting outputs of at least some programmable elements in the number of programmable elements to an acknowledge input of one of the plurality of input ports using a multiplexer element.

16. The method of claim 12, further comprising programmably connecting acknowledge outputs of at least some of the plurality of output ports to an acknowledge input of one of the plurality of input ports using a multiplexer element.

17. The method of claim 12, further comprising proving a path from an output of at least some of a plurality of programmable elements to an acknowledge input of at least some of the plurality of input ports using multiplexer elements.

18. An asynchronous crossbar circuit comprising:
a plurality of first multiplexer elements each programmably connecting at least some of a plurality of input ports to at least some of a plurality of output ports; and
a plurality of programmable completion detection elements each having a number of inputs and each receiving a control signal from at least some output ports of a group of output ports of the plurality of output ports, an output of at least some of the plurality of programmable completion detection elements connected to an input port, the control signal to acknowledge receipt of data from one of the plurality of input ports by the at least some output ports.

19. The asynchronous crossbar circuit of claim 18, wherein a number of the programmable completion detection elements is determined based on a number of input ports being copied to more than one output port.

20. The asynchronous crossbar circuit of claim 18, further comprising a plurality of second multiplexer elements programmably connecting outputs of the plurality of completion detection elements and acknowledge outputs of the plurality of output ports to acknowledge inputs of the plurality of input ports.

21. An asynchronous integrated circuit comprising:
a plurality of logic blocks;
a plurality of tracks to interconnect the logic blocks; and
a programmable crossbar structure comprising a plurality of input ports and a plurality of output ports each coupled to a track of the plurality of tracks, one or more of the plurality of input ports programmably connectible to send data to at least one output port of the plurality of output ports and a group of output ports, each output of the group of output ports that receives data from an input port, to be connected to send, responsive thereto, control signals via a programmable element to the input port.

22. The asynchronous integrated circuit of claim 21, wherein the programmable element is included in a number of programmable elements, and the a number of programmable elements is determined based on a number of input ports being copied to more than one output port.

23. A non-transitory machine-readable storage medium comprising instructions, which when executed by a machine cause the machine to perform a method, the method comprising:
programmably connecting one or more of a plurality of input ports to at least one output port of a plurality of output ports to send data to the at least one output port at an asynchronous crossbar; and
programmably connecting a group of the plurality of output ports, each receiving data from an input port, to send control signals via a programmable element to the input port in response to receiving the data, a number of programmable elements used to be determined based on a number of input ports being copied to more than one output port.

* * * * *

UNITED STATES PATENT AND TRADEMARK OFFICE
CERTIFICATE OF CORRECTION

PATENT NO.        : 8,300,635 B2
APPLICATION NO.   : 12/557287
DATED             : October 30, 2012
INVENTOR(S)       : Ekanayake et al.

Page 1 of 1

It is certified that error appears in the above-identified patent and that said Letters Patent is hereby corrected as shown below:

In the Specification

In column 1, line 23, before "a", insert --is--, therefor

In column 3, line 11, delete "below" and insert --below.--, therefor

In column 7, line 26, delete "1022" and insert --922--, therefor

Signed and Sealed this
Eleventh Day of November, 2014

Michelle K. Lee
*Deputy Director of the United States Patent and Trademark Office*